US012684451B2

(12) United States Patent
Kim et al.

(10) Patent No.: US 12,684,451 B2
(45) Date of Patent: Jul. 14, 2026

(54) APPARATUS AND METHOD FOR DETERMINING A PATH BASED ON PREDICTION

(71) Applicant: Electronics and Telecommunications Research Institute, Daejeon (KR)

(72) Inventors: Sunjin Kim, Daejeon (KR); Jong Seok Lee, Daejeon (KR); Namseok Ko, Daejeon (KR); Sun Me Kim, Daejeon (KR); No Ik Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 363 days.

(21) Appl. No.: 18/454,424

(22) Filed: Aug. 23, 2023

(65) Prior Publication Data

US 2024/0073775 A1 Feb. 29, 2024

(30) Foreign Application Priority Data

Aug. 23, 2022 (KR) ........................ 10-2022-0105612
Aug. 31, 2022 (KR) ........................ 10-2022-0109863

(51) Int. Cl.
*H04W 40/04* (2009.01)
*H04W 40/24* (2009.01)

(52) U.S. Cl.
CPC ........... *H04W 40/04* (2013.01); *H04W 40/24* (2013.01)

(58) Field of Classification Search
CPC .............................. H04W 40/04; H04W 40/24
See application file for complete search history.

(56) References Cited

U.S. PATENT DOCUMENTS

| | | | |
|---|---|---|---|
| 11,075,816 B2 | 7/2021 | Bruno et al. | |
| 2010/0262705 A1* | 10/2010 | Li | H04L 47/822 |
| | | | 709/229 |
| 2016/0087891 A1* | 3/2016 | Kwon | H04L 45/14 |
| | | | 370/392 |
| 2018/0270692 A1* | 9/2018 | Yoon | H04L 1/18 |
| 2020/0344655 A1* | 10/2020 | Rommer | H04W 76/36 |

FOREIGN PATENT DOCUMENTS

| | | |
|---|---|---|
| KR | 10-2016-0115072 A | 10/2016 |
| KR | 10-2017-0065166 A | 6/2017 |
| KR | 10-2021-0149576 A | 12/2021 |
| WO | WO 2020/192630 A1 | 12/2021 |

OTHER PUBLICATIONS

Matsushima et al., "Segment Routing IPV6 for Mobile User Plane draft-ietf-dmm-srv6-mobile-uplane-21" *IETF*, May 9, 2022 (pp. 1-38).

* cited by examiner

*Primary Examiner* — Jung H Park
(74) *Attorney, Agent, or Firm* — NSIP Law

(57) ABSTRACT

Provided are an apparatus and a method for computing a path for forwarding user data through the following steps: receiving a state measurement value or a state prediction value corresponding to the state measurement value of a state of a plurality of network resources within a mobile core network and a transport network; and computing the path for forwarding the user data, on the basis of either the state measurement value or the state prediction value, and topology of the mobile core network and topology of the transport network.

9 Claims, 9 Drawing Sheets

APPARATUS AND METHOD FOR DETERMINING A PATH BASED ON PREDICTION

CROSS REFERENCE TO RELATED APPLICATION

The present application claims priority to Korean Patent Application No. 10-2022-0105612, filed 23 Aug. 2022, and Korean Patent Application No. 10-2022-0109863, filed 31 Aug. 2022, the entire contents of which are incorporated herein for all purposes by this reference.

BACKGROUND OF THE INVENTION

Field of the Invention

The present disclosure relates to an apparatus and a method for determining a path of a mobile communication system on the basis of prediction of states of network resources.

Description of the Related Art

With the advent of new services, such as 5G, cloud computing, and IoT, future application services require a network technology for providing more powerful programmability and a simpler integrated network solution.

Currently, a mobile network is composed of a complex protocol stack with connection from a base station to a data network through a transport network of an overlay type, and uses a GTP-U tunneling protocol as a mechanism to ensure mobility. The GTP-U tunneling structure must be managed separately from the transport network, and it is difficult to set a path for protocol data unit (PDU) session traffic through traffic engineering (TE) and to perform dynamic in-network computing processing.

Segment routing IPv6 (SRv6) is a technology that allows an ingress node to control packets through an ordered list of instructions called segments. The SRv6 is a next-generation IP bearer protocol that combines IPv6 with segment routing that can program packet routing paths. Utilizing existing IPv6 forwarding technology, the SRv6 facilitates network programming through flexible IPv6 extension headers. Accordingly, the SRv6 reduces the number of required protocol types, offers great extensibility and programmability, and meets the various requirements of new services.

The foregoing is intended merely to aid in the understanding of the background of the present disclosure, and is not intended to mean that the present disclosure falls within the purview of the related art that is already known to those skilled in the art.

SUMMARY OF THE INVENTION

An embodiment provides a network function for determining a path of user data.

Another embodiment provides a method for determining a path of user data.

Still another embodiment provides a network function for evaluating performance by predicting states of network resources.

According to an embodiment, there is provided a network function within a mobile core network. The network function includes a processor and a memory, wherein the processor is configured to execute at least one program stored in the memory to perform: receiving a state measurement value or a state prediction value corresponding to the state measurement value of a state of a plurality of network resources within the mobile core network and a transport network; and computing a path for forwarding user data, on the basis of either the state measurement value or the state prediction value, and topology of the mobile core network and topology of the transport network.

In the network function, the processor may be configured to execute the at least one program to further perform: receiving a first performance evaluation result for the state measurement value; receiving a second performance evaluation result for the state prediction value when the first performance evaluation result indicates bad; and making a request to a resource state management function for either the state measurement value or the state prediction value on the basis of the first performance evaluation result and the second performance evaluation result.

In the network function, the processor may be configured to execute the at least one program to further perform: receiving a first performance evaluation result for the state measurement value and a second performance evaluation result for the state prediction value; and making a request to a resource state management function for either the state measurement value or the state prediction value on the basis of the first performance evaluation result and the second performance evaluation result.

In the network function, when performing the making of the request to the resource state management function for either the state measurement value or the state prediction value on the basis of the first performance evaluation result and the second performance evaluation result, the processor may be configured to perform making the request to the resource state management function for the state prediction value when both the first performance evaluation result and the second performance evaluation result indicate bad.

In the network function, when performing the making of the request to the resource state management function for either the state measurement value or the state prediction value on the basis of the first performance evaluation result and the second performance evaluation result, the processor may be configured to perform making the request to the resource state management function for the state measurement value when the first performance evaluation result indicates bad and the second performance evaluation result indicates good.

According to another embodiment, there is provided a method for determining a path for forwarding user data. The method includes: receiving a state measurement value or a state prediction value corresponding to the state measurement value of a state of a plurality of network resources within a mobile core network and a transport network; and computing the path for forwarding the user data, on the basis of either the state measurement value or the state prediction value, and topology of the mobile core network and topology of the transport network.

The method may further include: receiving a first performance evaluation result for the state measurement value; receiving a second performance evaluation result for the state prediction value when the first performance evaluation result indicates bad; and making a request to a resource state management function for either the state measurement value or the state prediction value on the basis of the first performance evaluation result and the second performance evaluation result.

The method may further include: receiving a first performance evaluation result for the state measurement value and a second performance evaluation result for the state prediction value; and making a request to a resource state management function for either the state measurement value or the state prediction value on the basis of the first performance evaluation result and the second performance evaluation result.

In the method, the making of the request to the resource state management function for either the state measurement value or the state prediction value on the basis of the first performance evaluation result and the second performance evaluation result may include making the request to the resource state management function for the state prediction value when both the first performance evaluation result and the second performance evaluation result indicate bad.

In the method, the making of the request to the resource state management function for either the state measurement value or the state prediction value on the basis of the first performance evaluation result and the second performance evaluation result may include making the request to the resource state management function for the state measurement value when the first performance evaluation result indicates bad and the second performance evaluation result indicates good.

According to still another embodiment, there is provided a network function within a mobile core network. The network function includes a processor and a memory, wherein the processor is configured to execute at least one program stored in the memory to perform: receiving state measurement values from a first network resource within the mobile core network and a second network resource within a transport network; generating state prediction values of the first network resource and the second network resource, wherein the state prediction values correspond to the state measurement values; evaluating, on the basis of the state measurement values and the state prediction values, performances of the first network resource and the second network resource; and forwarding, on the basis of results of the performance evaluation, the state measurement values or the state prediction values to a session management function to set a path.

The states of the network resources of the mobile core network and the transport network are considered together and the current and future states of the network resources are used to set a network path, so that network load can be quickly dealt with and the quality of service can be improved.

In addition, in a mobile network environment composed of several network resources, network resources appropriate for user service requirements, such as traffic engineering and service chaining, are used to set a network path, so that an integrated network solution can be implemented and future application services requiring a more powerful programming technology can be provided.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 5 is a diagram illustrating a mobile core network into which a transport network is integrated according to an embodiment;

FIG. 7 is a flowchart illustrating a method of monitoring network performance according to an embodiment;

DETAILED DESCRIPTION OF THE INVENTION

Figure 1:
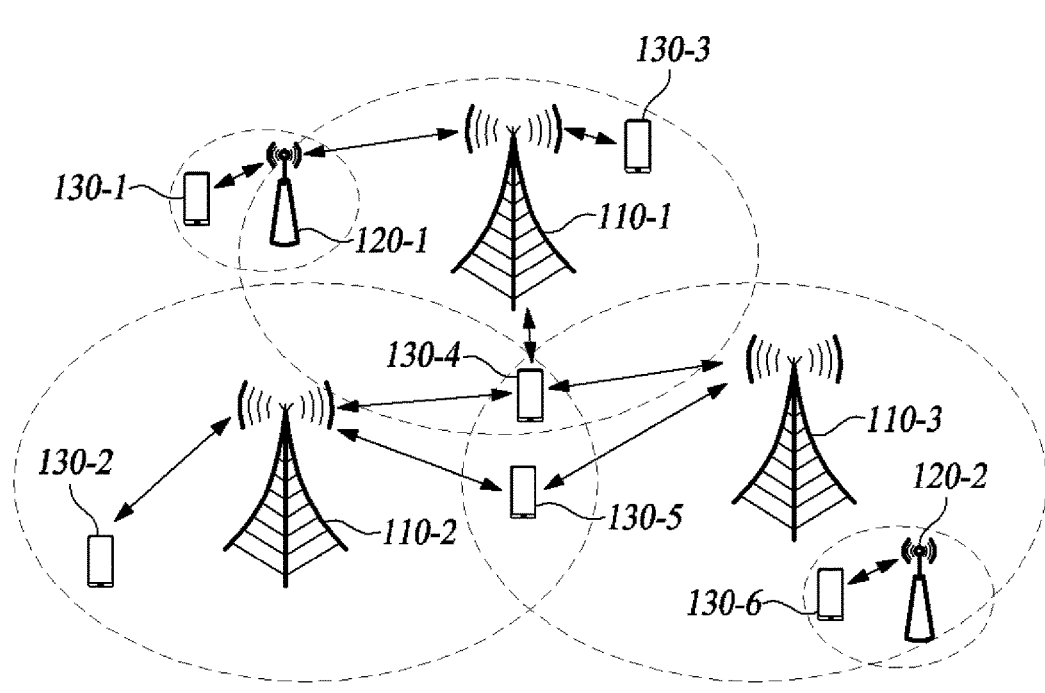
FIG. 1 is a conceptual diagram illustrating a mobile communication system according to an embodiment.

Hereinbelow, exemplary embodiments of the present disclosure will be described in detail with reference to the accompanying drawings such that the present disclosure can be easily embodied by those skilled in the art to which this present disclosure belongs. However, the present disclosure may be embodied in various different forms and should not be limited to the embodiments set forth herein. Further, in order to clearly explain the present disclosure, portions that are not related to the present disclosure are omitted in the drawings, and like reference numerals designate like elements throughout the specification.

Throughout the specification, a terminal may refer to a user equipment (UE), a mobile station (MS), a mobile terminal (MT), an advanced mobile station (AMS), a high-reliability mobile station (HR-MS), a subscriber station (SS), a portable subscriber station (PSS), an access terminal (AT), or a machine type communication device (MTC device), or may include all or some functions of the UE, MS, MT, AMS, HR-MS, SS, PSS, AT, or MTC device.

In addition, a base station (BS) may refer to a node B, an evolved node B (eNB), a gNB, an advanced base station (ABS), a high-reliability base station (HR-BS), an access point (AP), a radio access station (RAS), a base transceiver station (BTS), a mobile multi-hop relay (MMR)-BS, a relay station (RS) acting as a base station, a relay node (RN) acting as a base station, an advanced relay station (ARS) acting as a base station, a high-reliability relay station (HR-RS) acting as a base station, or a small base station (a femto BS, a home node B (HNB), a home eNodeB (HeNB), a pico BS, a macro BS, a micro BS), etc.), or may include all or some functions of the NB, eNB, gNB, ABS, HR-BS, AP, RAS, BTS, MMR-BS, RS, RN, ARS, HR-RS, or small base station.

Throughout the specification, when a part "includes" an element, it is noted that it further includes other elements, but does not exclude other elements, unless specifically stated otherwise.

In the specification, each of the expressions "A or B", "at least one of A and B", "at least one of A or B", "A, B, or C", "at least one of A, B, and C", and "at least one of A, B, or C" may include any one of the items listed together in that expression, or may include any possible combinations thereof.

In the specification, a term described in the singular may be interpreted as singular or plural unless an explicit term such as "one" or "single" is used.

In the specification, the term "and/or" includes each of the recited elements, and any combinations of one or more elements.

In the specification, the terms including ordinal numbers, such as "first", "second", etc., may be used to describe various elements, but the elements are not to be construed as being limited to the terms. The terms are only used to differentiate one element from other elements. For example, the "first" element may be named the "second" element without departing from the scope of the present disclosure, and the "second" element may also be similarly named the "first" element.

In the flowcharts described in the specification with reference to the drawings, the order of the steps may be changed, several steps may be merged, some steps may be divided, or particular steps may not be performed.

A communication network to which embodiments of the present disclosure are applied will be described. A communication network may be a non-terrestrial network (NTN), a 4G communication network (e.g., a long-term evolution (LTE) communication network), or a 5G communication network (e.g., a new radio (NR) communication network). In addition, for example, a next-generation communication network may be a 6G communication network or a new form of communication network, and is not limited to a particular form. Throughout the specification, a network may be, for example, a wireless Internet such as wireless fidelity (Wi-Fi); a mobile Internet such as wireless broadband Internet (WiBro) or worldwide interoperability for microwave access (WiMax); a 2G mobile communication network such as global system for mobile communication (GSM) or code-division multiple access (CDMA); a 3G mobile communication network such as wideband code-division multiple access (WCDMA) or CDMA2000; a 3.5G mobile communication network such as high speed downlink packet access (HSDPA) or high speed uplink packet access (HSUPA); a 4G mobile communication network such as a long-term evolution (LTE) network or an LTE-Advanced network; a 5G mobile communication network of NR; or other next-generation communication networks such as a 6G communication network or other networks, and is not limited to a particular form.

Throughout the specification, a terminal may be referred to as a user equipment (UE), a terminal, an access terminal, a mobile terminal, a station, a subscriber station, a mobile station, a portable subscriber station, a node, or a device.

Herein, as a terminal, the following devices capable of communication may be used: a desktop computer, a laptop computer, a tablet personal computer (PC), a wireless phone, a mobile phone, a smartphone, a smart watch, smart glasses, an e-book reader, a portable multimedia player (PMP), a portable gaming device, a navigation device, a digital camera, a digital multimedia broadcasting (DMB) player, a digital audio recorder, a digital audio player, a digital picture recorder, a digital picture player, a digital video recorder, and a digital video player.

Throughout the specification, a base station may be referred to as a Node B, an evolved Node B, a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (TP), a transmission and reception point (TRP), or a relay node.

FIG. 1 is a conceptual diagram illustrating a mobile communication system according to an embodiment.

Referring to FIG. 1, a communication system 100 may include a plurality of communication nodes 110-1, 110-2, 110-3, 120-1, 120-2, 130-1, 130-2, 130-3, 130-4, 130-5, and 130-6. The plurality of communication nodes may support 4G communications (e.g., long-term evolution (LTE), LTE-A (advanced)), 5G communications (e.g., new radio (NR)), and next-generation communications (e.g., 6G)) defined by the 3rd generation partnership project (3GPP) standards. The 4G communications may be performed in the frequency band of 6 GHz or below, and the 5G communications may be performed in the frequency band of 6 GHz below as well as the frequency band of 6 GHz above. The 6G communications may use the THz frequency band, or apply artificial intelligence (AI) and other technologies, and are not limited to any particular form.

For example, for the 4G communications, 5G communications, and 6G communications, the plurality of communication nodes may support the following protocols: a code-division multiple access (CDMA)-based communication protocol, a wideband CDMA (WCDMA)-based communication protocol, a time-division multiple access (TDMA)-based communication protocol, a frequency-division multiple access (FDMA)-based communication protocol, an orthogonal frequency-division multiplexing (OFDM)-based communication protocol, a filtered OFDM-based communication protocol, a cyclic prefix (CP)-OFDM based communication protocol, a discrete Fourier transform-spread-OFDM (DFT-s-OFDM)-based communication protocol, an orthogonal frequency-division multiple access (OFDMA)-based communication protocol, a single carrier (SC)-FDMA-based communication protocol, a non-orthogonal multiple access (NOMA)-based communication protocol, a generalized frequency-division multiplexing (GFDM)-based communication protocol, a filter bank multi-carrier (FBMC)-based communication protocol, a universal filtered multi-carrier (UFMC)-based communication protocol, and a space-division multiple access (SDMA)-based communication protocol.

In addition, the communication system 100 may further include a core network. When the communication system 100 supports the 4G communication, the core network may include a serving-gateway (S-GW), a packet data network (PDN)-gateway (P-GW), and a mobility management entity (MME). When the communication system 100 supports the 5G communications, the core network may include a user plane function (UPF), a session management function (SMF), and an access and mobility management function (AMF). In addition, for example, the communication system 100 supports the 5G communications, the core network may be configured on the basis of 5G communication-based functions or new functions, and may not be limited to a particular form.

Figure 2:
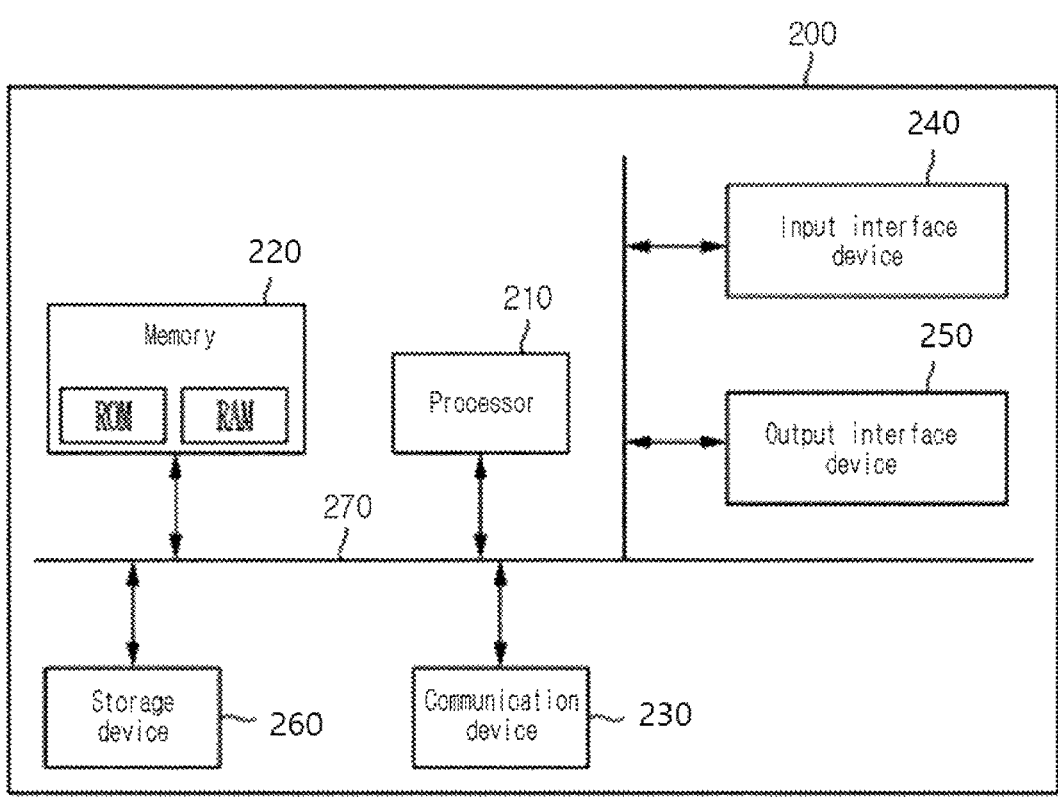
FIG. 2 is a diagram illustrating a device configuration according to an embodiment.

In the meantime, each of the plurality of communication nodes 110-1, 110-2, 110-3, 120-1, 120-2, 130-1, 130-2, 130-3, 130-4, 130-5, and 130-6, or network functions (NFs) constituting the communication system 100 may have a structure as shown in FIG. 2.

FIG. 2 is a diagram illustrating a device configuration according to an embodiment.

Referring to FIG. 2, a communication node 200 (NF) may include at least one processor 210, a memory 220, and a communication device 230 that is connected to a network to perform communication. In addition, the communication node 200 may further include an input interface device 240, an output interface device 250, and a storage device 260. Each of the elements included in the communication node 200 may be connected by a bus 270 to communicate with each other.

However, with the processor 210 in the center, each of the elements included in the communication node 200 may be connected via an individual interface or an individual bus, rather than the common bus 270. For example, the processor 210 may be connected via a dedicated interface to at least one of the following: the memory 220, the communication device 230, the input interface device 240, the output interface device 250, and the storage device 260.

The processor 210 may execute program commands stored in either the memory 220 or the storage device 260 or both. The processor 210 may refer to a central processing unit (CPU), a graphics processing unit (GPU), or a dedicated processor on which methods according to embodiments of the present disclosure are performed. Each of the memory 220 and the storage device 260 may include, for example, either a volatile storage medium or a non-volatile storage medium or both. For example, the memory 220 may include either read-only memory (ROM) or random access memory (RAM) or both.

Referring back to FIG. 1, the communication system 100 may include a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an "access network". Each of a first base station 110-1, a second base station 110-2, and a third base station 110-3 may form a macro cell. Each of a fourth base station 120-1 and a fifth base station 120-2 may form a small cell. The fourth base station 120-1, a third terminal 130-3, and a fourth terminal 130-4 may fall within the cell coverage of the first base station 110-1. A second terminal 130-2, the fourth terminal 130-4, and a fifth terminal 130-5 may fall within the cell coverage of the second base station 110-2. The fifth base station 120-2, the fourth terminal 130-4, the fifth terminal 130-5, and a sixth terminal 130-6 may fall within the cell coverage of the third base station 110-3. A first terminal 130-1 may fall within the cell coverage of the fourth base station 120-1. The sixth terminal 130-6 may fall within the cell coverage of the fifth base station 120-2.

Herein, each of the plurality of base stations 110-1, 110-2, 110-3, 120-1, and 120-2 may be referred to as a Node B, an evolved Node B, a gNB, a xNB, a base transceiver station (BTS), a radio base station, a radio transceiver, an access point, or an access node. Each of the plurality of terminals 130-1, 130-2, 130-3, 130-4, 130-5, and 130-6 may be referred to as a user equipment (UE), a terminal, an access terminal, a mobile terminal, a station, a subscriber station, a mobile station, a portable subscriber station, a node, or a device.

In the meantime, each of the plurality of base stations 110-1, 110-2, 110-3, 120-1, and 120-2 may operate in different frequency bands or the same frequency band. Each of the plurality of base stations 110-1, 110-2, 110-3, 120-1, and 120-2 may be connected to each other via an ideal backhaul link or a non-ideal backhaul link, and may exchange information with each other via the ideal backhaul link or the non-ideal backhaul link. Each of the plurality of base stations 110-1, 110-2, 110-3, 120-1, and 120-2 may be connected to the core network via an ideal backhaul link or a non-ideal backhaul link. Each of the plurality of base stations 110-1, 110-2, 110-3, 120-1, and 120-2 may transmit signals received from the core network to corresponding terminals 130-1, 130-2, 130-3, 130-4, 130-5, and 130-6, and may transmit signals received from the corresponding terminals 130-1, 130-2, 130-3, 130-4, 130-5, and 130-6 to the core network.

In addition, for example, the core network of the communication system is constructed in an architecture based on interactions between the NFs. For example, as a core network of a 5G system, the 5G Core (5GC) may include various entities. Specifically, the AMF may manage the access and mobility of a terminal. The AMF may perform functions of managing the security of a non-access stratum (NAS) and the mobility of a terminal in an idle state.

The SMF may manage a session. For example, the SMF may perform a function of assigning terminal Internet protocol (IP) addresses, and may control a protocol data unit (PDU) session.

In addition, the policy control function (PCF) may perform a function of controlling policy. In addition, the UPF may perform a function of controlling a user plane. The UPF may perform all or part of the user plane functions of the serving gateway (S-GW) and the packet data network gateway (P-GW) of the previous mobile communication system (e.g., 4G) as a function of a gateway for transmitting and receiving data. In addition, the UPF may perform a function of handling the PDU. In addition, the application function (AF) may control an application function. The AF may perform a function of providing a plurality of services to a terminal. The unified data management (UDM) may perform a function of managing unified data. Herein, the UDM may perform a function of managing subscriber information.

In addition, for example, a core network of the next-generation system (e.g., 6G) may be include the functions of the same forms as those of the 5G system, referred to by the same names, or may include new entities (or functions) based on the next-generation system, and is not limited to a particular embodiment. However, the next-generation system may include the functions for managing the access and mobility of a terminal or managing a session as described above, and matters described below may be equally applied. For convenience of description, the following description is based on the 5G system, but may be equally applied to the next-generation system without limitation.

Figure 3:
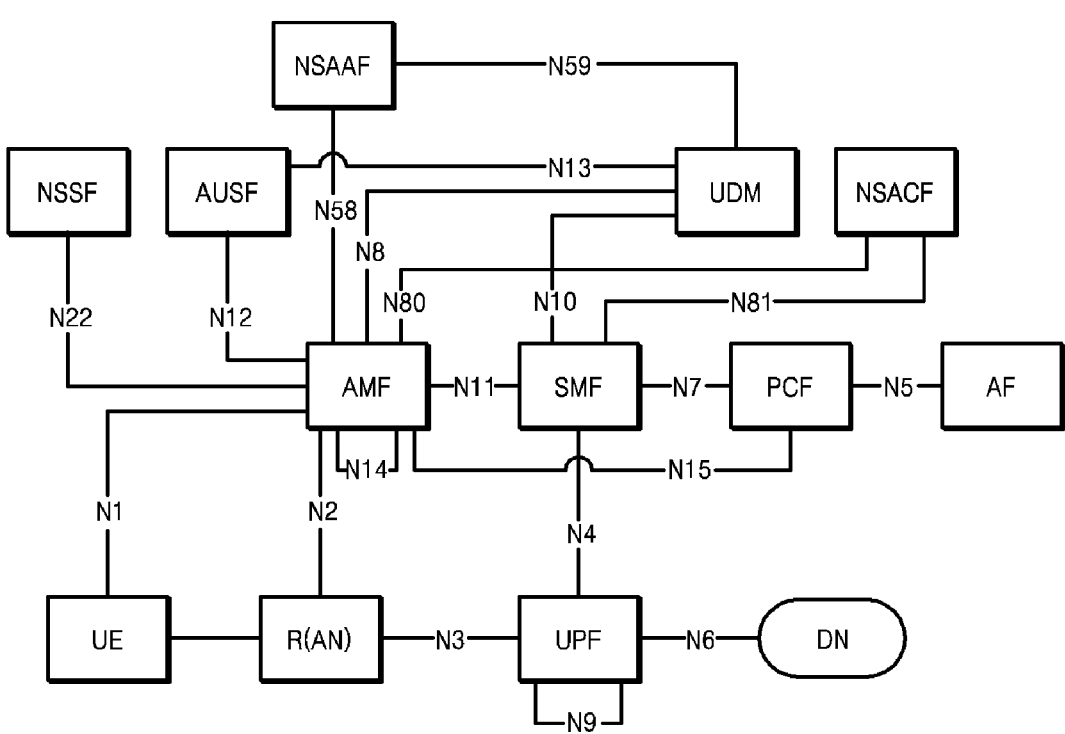
FIG. 3 is a diagram illustrating reference points according to an embodiment.

FIG. 3 is a diagram illustrating reference points according to an embodiment.

Referring to FIG. 3, reference points may represent the interaction between NF services within NFs described by a point-to-point reference point between two NFs. For example, the N1 may be a reference point between the terminal (UE) and the AMF. The N2 may be a reference point between the (radio) access network ((R)AN) and the AMF. The N3 may be a reference point between the (R)AN and the UPF. The other reference points may be as shown in Table 1 below, but may not be limited thereto.

TABLE 1

N1: Reference point between the UE and the AMF.
N2: Reference point between the (R)AN and the AMF.
N3: Reference point between the (R)AN and the UPF.
N4: Reference point between the SMF and the UPF.
N5: Reference point between the PCF and an AF or TSN AF.
N6: Reference point between the UPF and a Data Network.
N7: Reference point between the SMF and the PCF.
N8: Reference point between the UDM and the AMF.
N9: Reference point between two UPFs.
N10: Reference point between the UDM and the SMF.
N11: Reference point between the AMF and the SMF.
N12: Reference point between AMF and AUSF.
N13: Reference point between the UDM and Authentication Server function the AUSF.
N14: Reference point between two AMFs.
N15: Reference point between the PCF and the AMF in the case of non-roaming scenario, PCF in the visited network and AMIF in the case of roaming scenario.
N16: Reference point between two SMFs, (in roaming case between SMF in the visited network and the SMF in the home network).
N16a: Reference point between SMF and I-SMF.
N17: Reference point between AMF and 5G-EIR.

TABLE 1-continued

N18: Reference point between any NF and UDSF.
N19: Reference point between two PSA UPFs for 5G LAN-type service.
N22: Reference point between AMF and NSSF.

Figure 4:
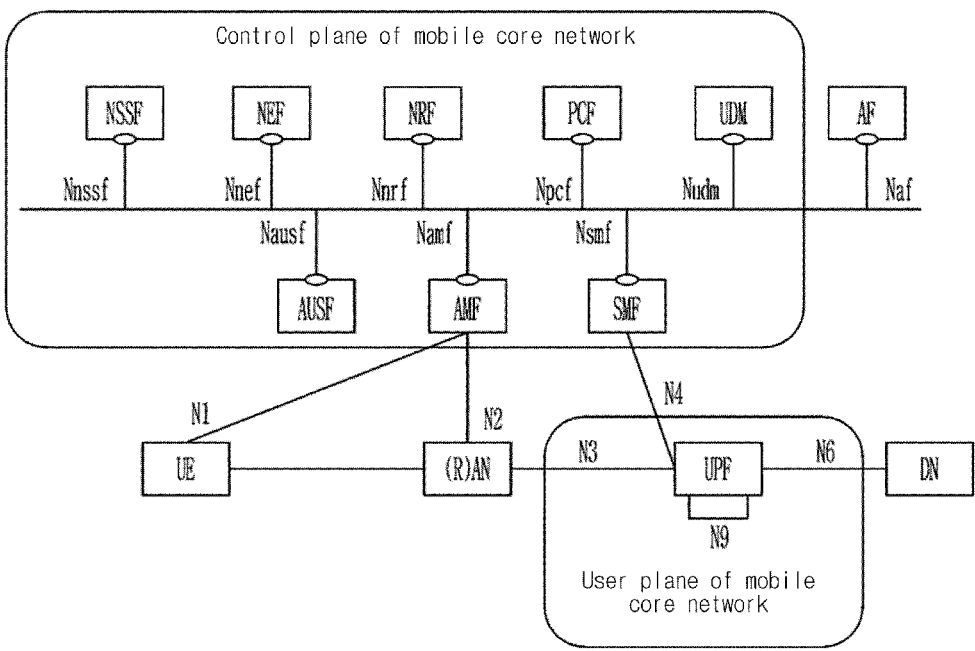
FIG. 4 is a diagram illustrating a mobile communication system according to an embodiment.

FIG. 4 is a diagram illustrating a mobile communication system according to an embodiment.

Referring to FIG. 4, a mobile communication system according to an embodiment includes a (R)AN (for example, next-generation (NG)-RAN) and a mobile core network.

The mobile core network is positioned between the (R)AN and an external data network (DN), and may provide a user with various types of services. A user plane may include one or more UPFs, and may provide user traffic to a terminal (UE) connected over the wireless access network. A control plane may include NFs, such as an AMF, a SMF, and a PCF, and may process control signals for providing services to a terminal.

Figure 5:
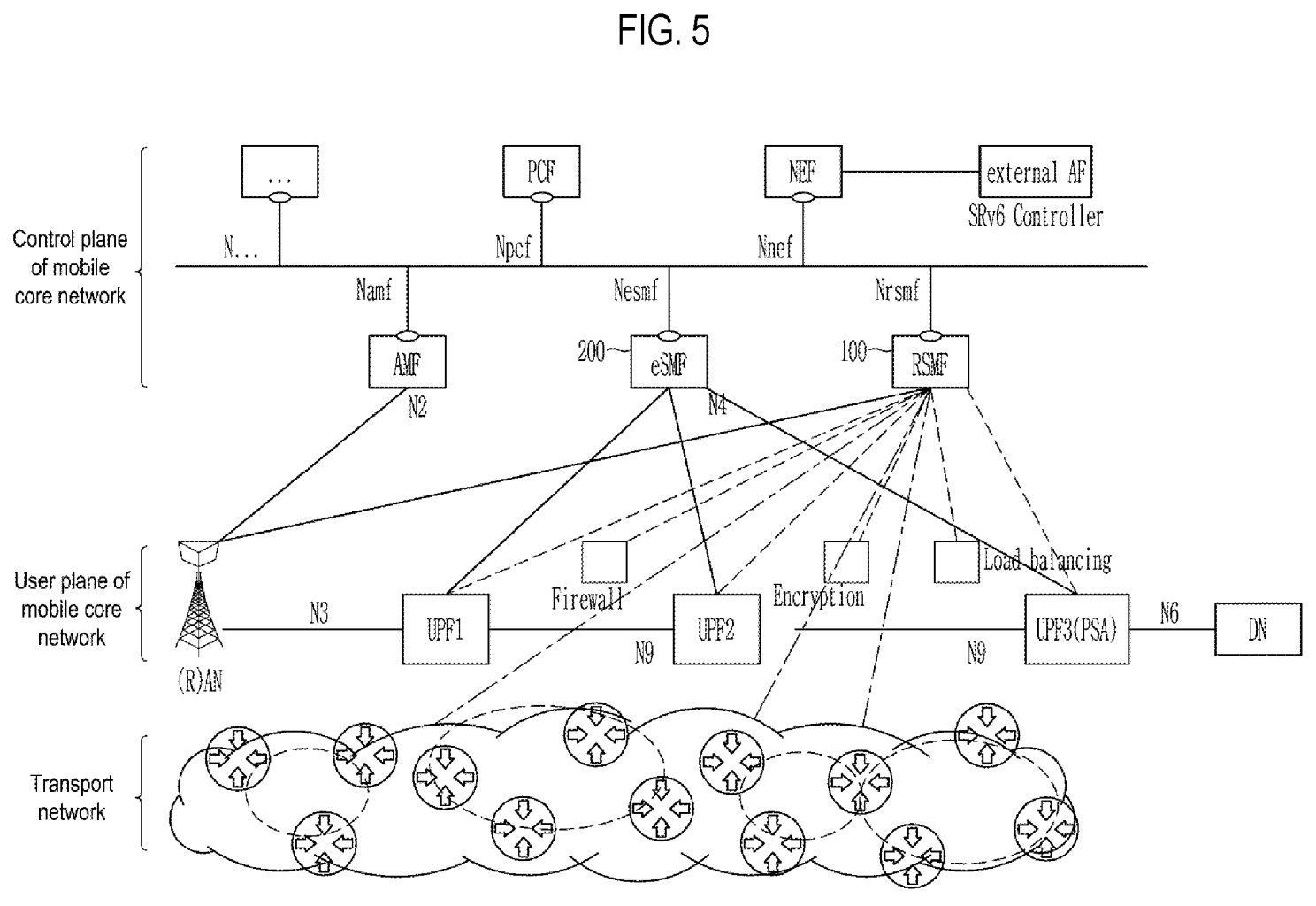

FIG. 5 is a diagram illustrating a mobile core network into which a transport network is integrated according to an embodiment.

Referring to FIG. 5, the transport network may include network equipment, such as a plurality of routers/switches, cloud devices, and service servers directly connected to the network, and at least some of the network equipment may have a segment routing IPv6-aware (SRv6-aware) function. Transport network resources (that is, network devices) having a SRv6-aware function are network programmable and are capable of accommodating the requirements of various application services.

A user plane of the mobile core network may include a plurality of UPFs, a NG-RAN connected to the UPFs via an N3 interface, a virtual network function (VNF), and a cloud-native network function (CNF). The core network resources, such as the UPF and the NG-RAN, use an SRv6 technology to forward user traffic from a base station (NG-RAN) through a UPF (PDU session anchor (PSA)) to a data network (DN) outside the mobile core network.

In an embodiment, the user plane may provide service chaining that links different network and security functions together, such as firewalls, domain name system (DNS), load balancing, caching, and network address translation, according to the requirements of application services. The user plane according to an embodiment generates a network path composed of network resources appropriate for service requirements of a user, thereby providing the user with services.

A control plane of the mobile core network may include NFs such as an AMF, an enhanced SMF (eSMF), a resource state management function (RSMF), a PCF, a network exposure function (NEF), and an AF. In an embodiment, the NFs within the control plane may generate an optimal network path in an integrated network environment in which the resource states of the mobile core network and the transport network are simultaneously considered.

The RSMF according to an embodiment may continuously or periodically measure the states of the network resources of the transport network and the mobile core network and evaluate/monitor performance to manage the transport network resources and the mobile core network resources. The eSMF according to an embodiment may be associated with the RSMF to generate an optimal network path.

In an embodiment, a situation in which a new session is established while a network service is provided to a user may be considered. Performance monitoring (network performance monitoring) of the transport network resources and the core network resources may be performed as follows.

Network performance (for example, quality of service (QoS)) may be measured through performance parameters, such as bandwidth, data rate, packet delay, the number of packet transmissions, the number of packet retransmissions, reliability, resource (for example, a CPU, and memory) usage, and throughput of the network resources (for example, the UPF, the R(AN), and a router/switch within the transport network) constituting the networks.

In an embodiment, predetermined performance threshold values (for example, threshold values for determining whether the QoS requirements are satisfied) may be used to evaluate network performance. For example, when a measurement value for a performance parameter is beyond a performance threshold value, it is determined that the corresponding network device may have network performance deterioration, thereby performing performance evaluation of one network resource. Then, the NFs within the control plane may determine that a countermeasure is required.

For example, the bandwidth usage of a network resource having the bandwidth of 100 Mbps is measured as a performance parameter and a predetermined threshold value may be 70%. When the average data usage at an evaluation time point measures 80 Mbps, a state measurement value (80%) exceeds the threshold value (70%). In order to satisfy the QoS requirements, a countermeasure such as path bypassing the network resource may be taken. That is, network performance monitoring may be a process of performing performance evaluation of a network device and discovering a result of performance evaluation.

In an embodiment, the RSMF may manage a state of each individual network resource on the basis of results of monitoring the network devices within the mobile core network and the transport network. In an embodiment, the eSMF may generate a network path based on current state measurement or future state prediction for the network resources.

Figure 6:
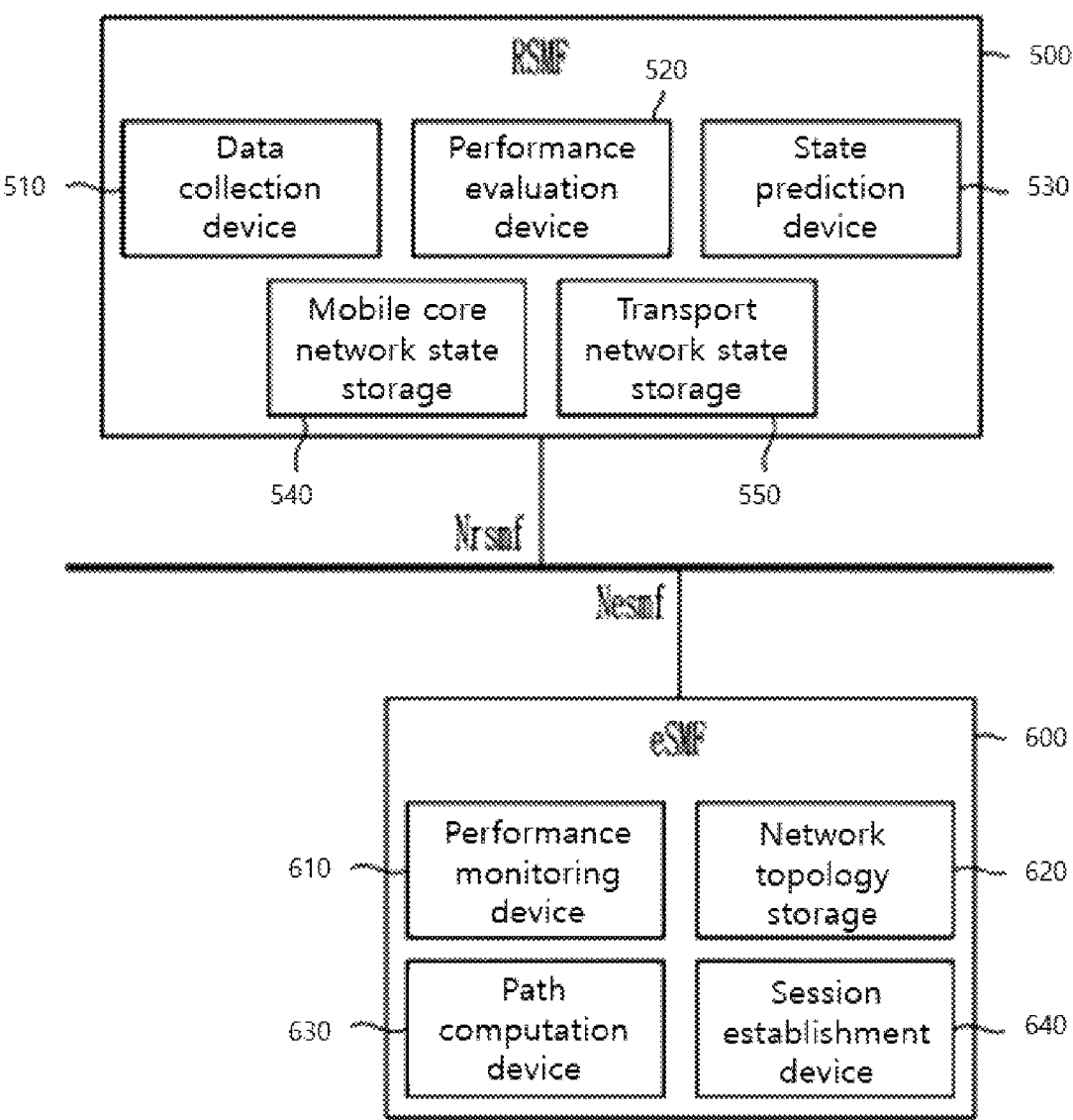
FIG. 6 is a block diagram illustrating main NFs according to an embodiment.

FIG. 6 is a block diagram illustrating main NFs according to an embodiment.

Referring to FIG. 6, an RSMF 500 according to an embodiment may continuously or periodically monitor the performances of network resources of a transport network and a mobile core network and manage the states of the network resources.

The RSMF 500 may include a data collection device 510, a performance evaluation device 520, a state prediction device 530, a mobile core network state storage 540, and a transport network state storage 550.

When a performance monitoring request is received from the eSMF 600, the data collection device 510 may make a request to the mobile core network for state information (or state measurement values, performance information) of the core network resources. In addition, the data collection device 510 may make a request, through the NEF, to an external AF (for example, an SRv6 controller) outside the mobile core network for state information (or state measurement values, performance information) of the transport network resources.

In an embodiment, the performance monitoring request received from the eSMF 600 may include network resource information and performance threshold values of the mobile core network. Afterward, the data collection device 510 may store and manage the state information of the transport network resources received from the external AF and the state information of the core network resources collected from the mobile core network.

The performance evaluation device 520 may evaluate the performances of the network resources on the basis of current (latest) state measurement values of the network resources collected from the mobile core network and the transport network and future state prediction values predicted by the state prediction device 530, and may store performance evaluation results. For example, the performance evaluation device 520 may determine whether a current state measurement value and a future state prediction value are beyond a predetermined performance threshold value, and may store a performance evaluation result based on the determination.

The state prediction device 530 may predict the states of the network resources at a future prediction time point on the basis of information and data collected by the data collection device 510. For example, a prediction model, such as machine learning/deep learning, may be used to predict the states of the network resources after n hours. In an embodiment, the eSMF 600 may provide a prediction time point for the states of the network resources.

The mobile core network state storage 540 may store and manage current (latest) state measurement values (or performance evaluation results) and future state prediction values (or performance evaluation results) of the mobile core network resources.

The transport network state storage 550 may store and manage current (latest) state measurement values (or performance evaluation results) and future state prediction values (or performance evaluation results) of the transport network resources.

The eSMF 600 according to an embodiment may generate and manage a path required for establishing a session of the mobile core network. The eSMF 600 may generate, on the basis of topology information of the mobile core network and the transport network and state information of the network resources of the mobile core network and the transport network received from the RSMF 500, an optimal network path that satisfies the requirements of application services. In an embodiment, the topology information of the mobile core network and the topology information of the transport network may include feature information of network devices constituting each topology.

When an optimal network path is generated, the eSMF 600 may generate session establishment parameters (a packet detection rule (PDR), a forwarding action rule (FAR), an QoS enforcement rule (QER), and a SRv6 action rule (SAR)) according to the generated network path, and may provide the generated session establishment parameters to entities (an NG-RAN and a UPF) within the user plane.

The eSMF 600 according to an embodiment may include a performance monitoring device 610, a network topology storage 620, a path computation device 630, and a session establishment device 640.

The performance monitoring device 610 may make a request to the RSMF 500 for performance monitoring, and may store and manage performance evaluation results received from the RSMF 500. The request for performance monitoring may include the network resource information and the performance threshold values of the mobile core network.

The network topology storage 620 may keep the topology information of the mobile core network generated by the eSMF 600 and the topology information of the transport network received from the external AF (for example, the SRv6 controller) up to date and may manage the same in an integrated manner. In addition, when the network resource information of the mobile core network is changed, the RSMF 500 may be notified. In an embodiment, when the network resource information of the mobile core network is changed, the network topology storage 620 may notify the RSMF 500 of change information of the network resource information.

The network topology storage 620 may manage the topology information of the core network and the transport network and the feature information, such as types of services that may be provided by the mobile core network and provision capability, of the network resources together. Herein, the service types may include an SRv6-aware function, firewalls, DNS, load balancing, caching, and network address translation.

The path computation device 630 may compute an optimal network path on the basis of the state information (including current state measurement values and future state prediction values) of the network resources of the mobile core network and the transport network, the topology information of the mobile core network and the transport network, and session establishment request information.

In an embodiment, before computing an optimal network path, the path computation device 630 may determine whether current (latest) state information or future state information of the network resources is required, and may make a request to the RSMF 500 for the state information of the network resources which is determined to be required. For example, when the RSMF 500 evaluates current performances and future performances of the network resources on the basis of measured states and predicted states of the network resources and reports results of performance evaluation to the eSMF 600, the eSMF 600 may use the results of performance evaluation to determine the state information (current state measurement values or future state prediction values) of the network resources required for computation of an optimal path and may make a request to the RSMF 500 for the required state information.

When computing an optimal network path, the path computation device 630 may use a path computation element protocol (PCEP). The optimal network path computed by the path computation device 630 may include service chaining according to service requirements.

The session establishment request information used in path computation may include single-network slice selection assistance information (S-NSSAI), data network name (DNN), UE location, QoS parameters, and service requirements (for example, firewall, and load balancing).

The session establishment device 640 may manage policy and charging control rules (PCC rules) received from a PCF and the session establishment request information required for session establishment. In addition, the session establishment device 640 may generate the session establishment parameters (for example, the PDR, FAR, QER, and SAR) on the basis of a result of path computation and may provide the session establishment parameters to entities (an NG-RAN and a UPF) within the user plane. When session establishment is completed, the session establishment device 640 may report the completion of session establishment to the PCF.

Figure 7:
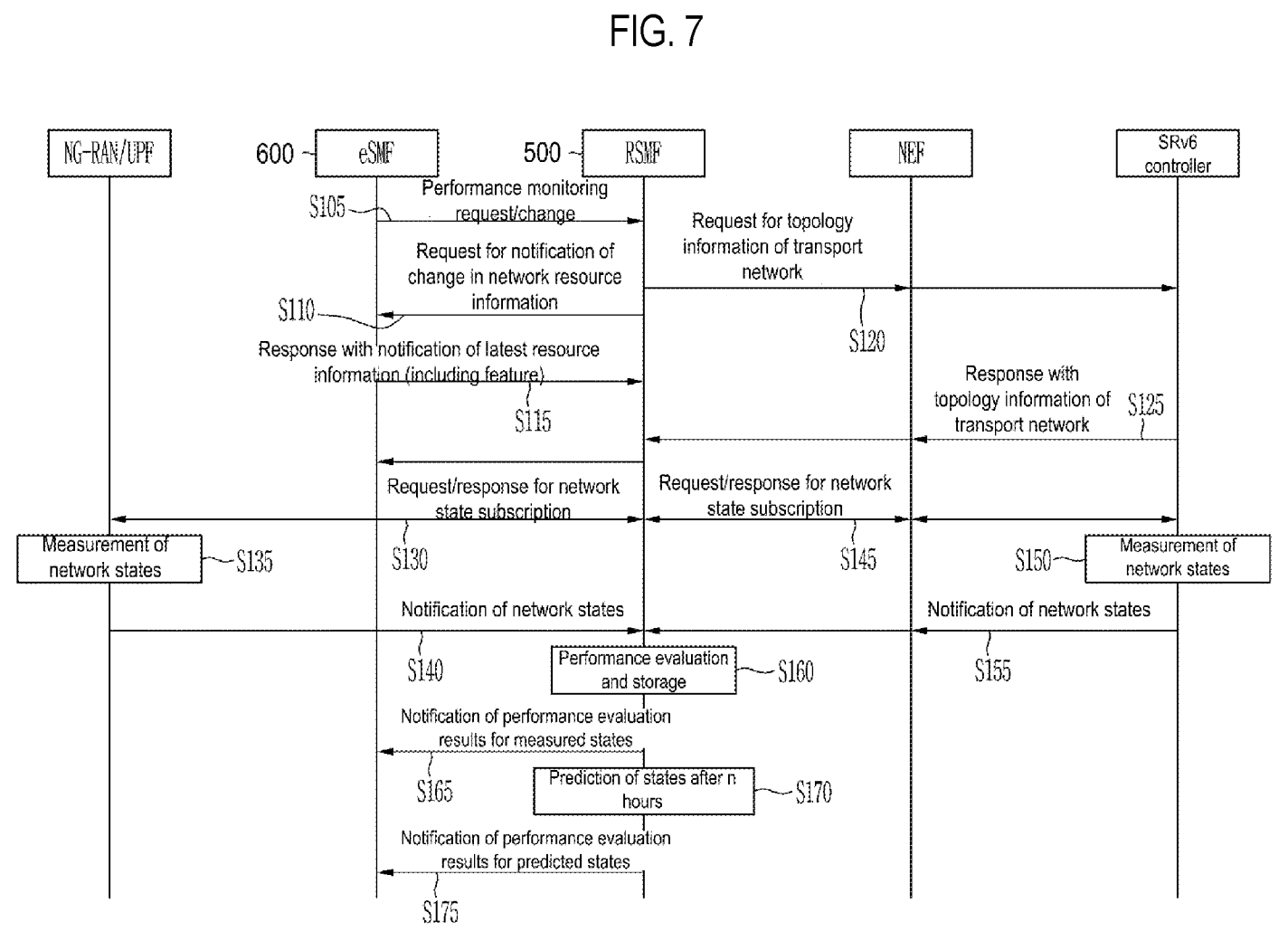

FIG. 7 is a flowchart illustrating a method of monitoring network performance according to an embodiment.

An RSMF 500 according to an embodiment may receive, from an eSMF 600, a request for performance monitoring of network resources of a mobile core network and a transport network, and may receive current state measurement values of the network resources from the network resources (an NG-RAN, a UPF, a router, and a switch) within the mobile core network and the transport network.

Referring to FIG. 7, a data collection device 510 of the RSMF 500 may receive a performance monitoring request for the network resources from the eSMF 600 in step S105. In an embodiment, the performance monitoring request may include at least one of the following: network resource information (feature information of the network resources may be included) of the mobile core network, performance threshold values (a bandwidth usage threshold value (e.g., 70%), and a CPU utilization rate threshold value (e.g., 70%)), and monitoring parameters (measurement intervals (or notification intervals) (e.g., 5 minutes) of state measurement values of the network resources, and a prediction time point (e.g., 0.5 hours later) of future state prediction).

When there is a need to change a performance threshold value or monitoring parameter, a PCF may instruct the eSMF 600 to change the performance threshold value and/or monitoring parameter. Afterward, the eSMF 600 may transmit a performance monitoring request including the changed performance threshold value and/or monitoring parameter to the RSMF 500. In an embodiment, the need to change a performance threshold value or monitoring parameter may be driven by an operation and management (OAM) function within the mobile core network.

The RSMF 500 may make a request to the eSMF 600 for notification of change in the network resource information of the mobile core network in step S110. When there is a change in the network resource information, the eSMF 600 may transmit the changed network resource information (latest resource information) to the RSMF 500 in step S115.

In addition, the RSMF 500 may make a request to an SRv6 controller (external AF) for topology information of the transport network via the NEF in step S120, and may receive the topology information of the transport network from the SRv6 controller via the NEF in step S125. The RSMF 500 may acquire network resource information of the transport network from the topology information of the transport network.

Afterward, the RSMF 500 may forward the topology information of the transport network to the eSMF 600. Accordingly, a network topology storage 620 of the eSMF 600 may keep the topology information of the mobile core network and the transport network up to date.

In the meantime, when transmitting the performance monitoring request to the RSMF 500, the eSMF 600 may make a request to the SRv6 controller for topology information of the transport network via the NEF and may receive the topology information of the transport network from the SRv6 controller via the NEF. Afterward, the eSMF 600 may extract network resource information from the topology information of the transport network, and may transmit the extracted network resource information to the RSMF 500.

The data collection device 510 of the RSMF 500 may make a request to the network resources (a UPF and the NG-RAN) within the user plane for subscription to the states of the network resources and may receive a response to the subscription request in step S130. In an embodiment, a network state subscription request may include a monitoring parameter such as a notification interval of a state measurement value of a network resource.

Afterward, the network resources within the user plane may measure the states of the network resources in step S135, and may notify the RSMF 500 of state measurement values of the network resources at intervals predetermined by the monitoring parameters in step S140. The state mea-surement values of the network resources of the mobile core network may be stored in a mobile core network state storage 540 of the RSMF 500.

In addition, the data collection device 510 of the RSMF 500 may make a request to the external AF (for example, the SRv6 controller) for subscription of the states of the transport network resources via the NEF and may receive a response to the subscription request via the NEF in step S145.

Afterward, the external AF may measure the states of the network resources in step S150, and may notify the RSMF 500 of state measurement values of the network resources via the NEF at notification intervals predetermined by the monitoring parameters in step S155. The state measurement values of the network resources of the transport network may be stored in a transport network state storage 550 of the RSMF 500.

When the state measurement values of the network resources are received from the network resources (the NG-RAN and a UPF) of the mobile core network and the external AF (the SRv6 controller), a performance evaluation device 520 of the RSMF 500 may evaluate the performance of each network resource on the basis of the performance threshold values and may store performance evaluation results in step S160.

For example, when a state measurement value of the bandwidth usage of any network resource is 69% and a performance threshold value is 70%, the performance evaluation device 520 may evaluate the performance of the network resource as "good (or excellent)". Alternatively, for example, when a state measurement value of the bandwidth usage of any network resource is 72% and a performance threshold value is 70%, the performance evaluation device 520 may evaluate the performance of the network resource as "bad (or poor)".

The performance evaluation device 520 may notify the eSMF 600 of the performance evaluation results for the network resources as performance monitoring results in step S165.

A state prediction device 530 of the RSMF 500 according to an embodiment may predict, on the basis of the data collected by the data collection device 510, the states of the network resources at a predetermined prediction time point in step S170. The performance evaluation device 520 may notify the eSMF 600 of performance evaluation results for future prediction values of the network resources in step S175.

For example, when it is determined that the performance evaluation result for a network resource indicates "bad", the state prediction device 530 may predict the state of the network resource at a predetermined prediction time point. Alternatively, even when it is determined that performance evaluation of the current state measurement values indicates "good", the state prediction device 530 of the RSMF 500 may predict future states of the network resources corresponding to the current state measurement values received every measurement interval. That is, the state prediction device 530 may predict the future states of the network resources corresponding to receiving the current state measurement values from the network resources within the user plane and the external AF.

Figure 8:
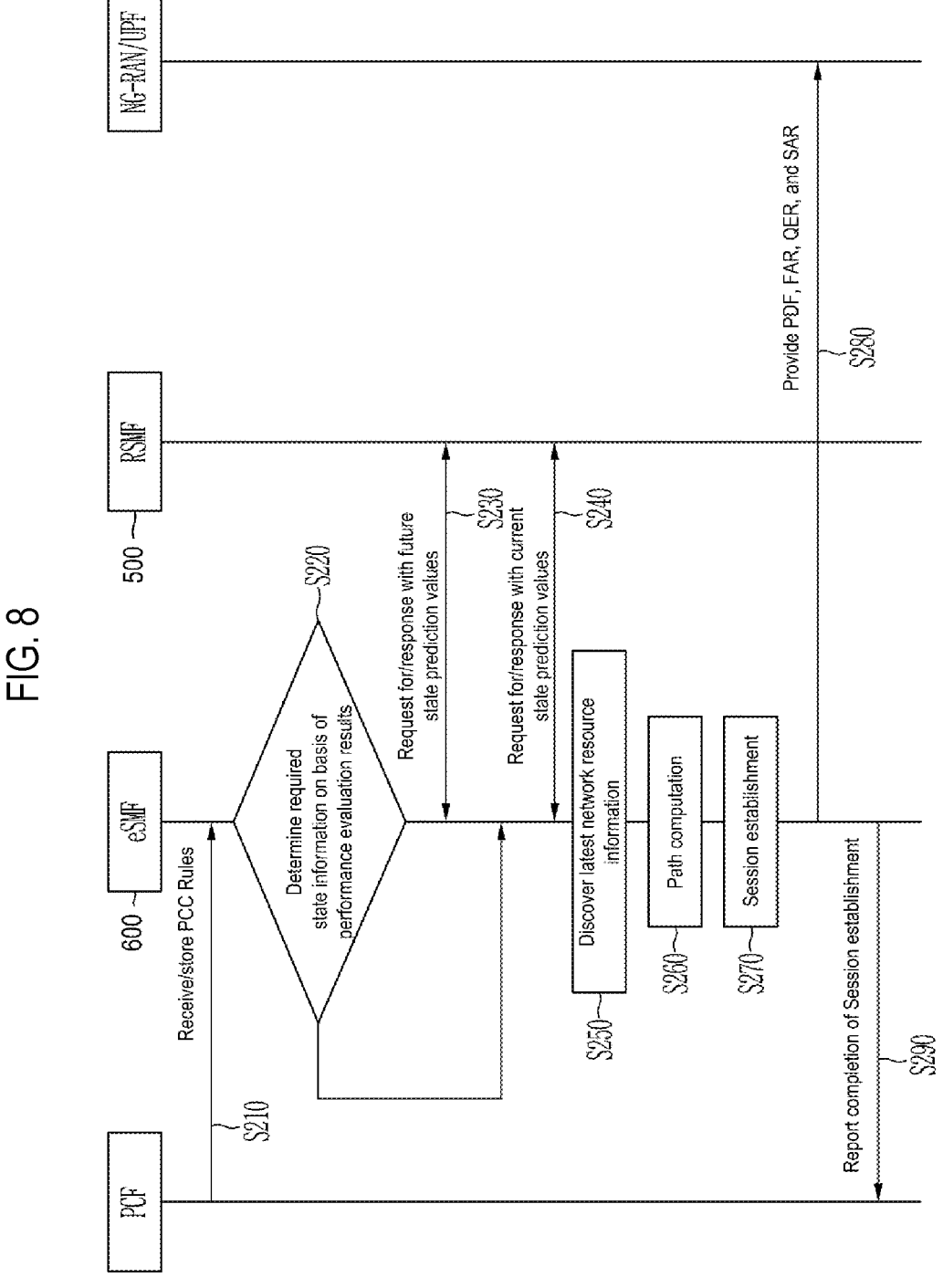
FIG. 8 is a flowchart illustrating a method of generating a path of an integrated network according to an embodiment.

FIG. 8 is a flowchart illustrating a method of generating a path of an integrated network according to an embodiment.

Referring to FIG. 8, a session establishment device 640 of an eSMF 600 according to an embodiment may receive PCC rules for session establishment from a PCF in step S210. Afterward, the eSMF 600 may receive state information of network resources from an RSMF 500 and may use the received state information of the network resources to generate a network path for forwarding user data.

The eSMF 600 according to an embodiment may determine state information of network resources on the basis of performance evaluation results received from the RSMF 500 and may make a request to the RSMF 500 for the determined state information.

When performance evaluation results based on state information of network resources are received from the RSMF 500, the eSMF 600 may discover required state information on the basis of the performance evaluation results. That is, current state measurement values or future state prediction values may be determined as state information required for path computation according to the performance evaluation results.

Table 2 below shows results of evaluating the performance of a network resource by a performance evaluation device 520 and results of predicting a future (0.5 hours later) state of the network resource by a state prediction device 530 when state measurement values of the network resource received at 5-minute intervals were measured at 5-minute intervals and received. In an embodiment, a measurement interval (or notification interval) of a current state measurement value and a prediction time point of a future state prediction value of a network resource may be included as monitoring parameters in a performance monitoring request received from the eSMF 600.

TABLE 2

| | | Current (latest) | | Future (0.5 hours later) Predicted | |
|---|---|---|---|---|---|
| Number | Measurement time | Bandwidth usage (%) | Perfor- mance | bandwidth usage (%) | Perfor- mance |
| . . . | | | | | |
| 11 | 10:05 | 69 | Good | — | — |
| 12 | 10:10 | 72 | Bad | 74 | Bad |
| 13 | 10:15 | 73 | Bad | 71 | Bad |
| 14 | 10:20 | 70 | Bad | 69 | Good |
| 15 | 10:25 | 68 | Good | — | — |
| . . . | | | | | |

When computing a network path, the eSMF 600 according to an embodiment may use either a current state measurement value or a future state prediction value.

In an embodiment, when the RSMF 500 reports performance evaluation results to the eSMF 600, the eSMF 600 may use state information for the performance evaluation result indicating bad, for path computation. Herein, the eSMF 600 may determine either a current state measurement value or a future state prediction value as state information to be used for path computation in step S220, and depending on a result of determination, may make a request to the RSMF 500 for the future state prediction value in step S230 or may make a request to the RSMF 500 for the current state measurement value in step S240.

For example, when a performance evaluation result for a current state measurement value indicates bad and a performance evaluation result for a future state prediction value indicates good (Number 14 of Table 2), the eSMF 600 may make a request to the RSMF 500 for the current state measurement value (bandwidth usage of 70%) as the state information of the network resource for path computation. In addition, when both performance evaluation results for a current state measurement value and a future state prediction value indicate bad, the eSMF 600 may make a request to the RSMF 500 for the future state prediction value.

Referring to Table 2, when the eSMF 600 determines required state information on the basis of a performance evaluation result received between 10:10 and 10:15, the eSMF 600 may make a request to the RSMF 500 for a future state prediction value and may perform path computation using the predicted bandwidth usage, which is received from the RSMF 500, of 74 predicted at the time point corresponding to 10:10.

In another embodiment, the RSMF 500 may determine either a current state measurement value or a future state prediction value as state information to be used for path computation, and may not report performance evaluation results for the current state measurement value and the future state prediction value to the eSMF 600.

Herein, when the PCC rules are received from the PCF, the eSMF 600 may request the RSMF 500 to forward one piece of state information that is either a current state measurement value or a future state prediction value (a process of determining required state information is not performed), and the state information (the current state measurement value or future state prediction value) determined by the RSMF 500 may be forwarded to the eSMF 600.

In this case, the eSMF 600 may compute a path by using state information for which lower performance is evaluated. That is, when the RSMF 500 receives a request from the eSMF 600 for state information of a network resource for path computation, the state information for which performance is lower among the two pieces of state information may be reported to the eSMF 600. Even when it is determined that both sides indicate good or bad, the eSMF 600 may compute a path by using the state information for which performance is lower.

Referring to Table 2, when a request for forwarding state information of the network resource is received from the eSMF 600 between 10:10 and 10:15, a performance evaluation result for a future state prediction value seems worse and the RSMF 500 may transmit the future state prediction value to the eSMF 600. Alternatively, when a request for state information of the network resource is received from the eSMF 600 between 10:15 and 10:20, a performance evaluation result for a current state measurement value seems worse and the RSMF 500 may transmit the current state measurement value to the eSMF 600.

Referring to FIG. 8, a path computation device 630 of the eSMF 600 may discover topology information of the mobile core network and topology information of the transport network stored in a network topology storage 620. In addition, the path computation device 630 may discover information (S-NSSAI, DNN, UE location, QoS parameters, and service requirements such as firewall, and load balancing) from the session establishment device 640 requested for session establishment in step S250.

The path computation device 630 of the eSMF 600 may compute an optimal network path for forwarding user data from the state information of the network resources of the mobile core network and the transport network, the latest topology information of the mobile core network and the transport network, and the session establishment request information in step S260. When computing a path, the eSMF 600 according to an embodiment may use a path computation element protocol (PCEP), and the computed path may include service chaining.

The session establishment device 640 of the eSMF 600 may generate session establishment parameters (a PDR, FAR, QER, and SAR) on the basis of the path computation result in step S270, and may provide the generated session establishment parameters to the user plane entities (an NG-RAN and a UPF) in step S280.

In addition, when session establishment is completed, the session establishment device 640 of the eSMF 600 may report the completion of session establishment to the PCF in step S290.

As described above, the states of the network resources of the mobile core network and the transport network are considered together and the current and future states of the network resources are used to set a network path, so that network load can be quickly dealt with and the quality of service can be improved.

In addition, in a mobile network environment composed of several network resources, network resources appropriate for user service requirements, such as traffic engineering and service chaining, are used to set a network path, so that an integrated network solution can be implemented and future application services requiring a more powerful programming technology can be provided.

Figure 9:
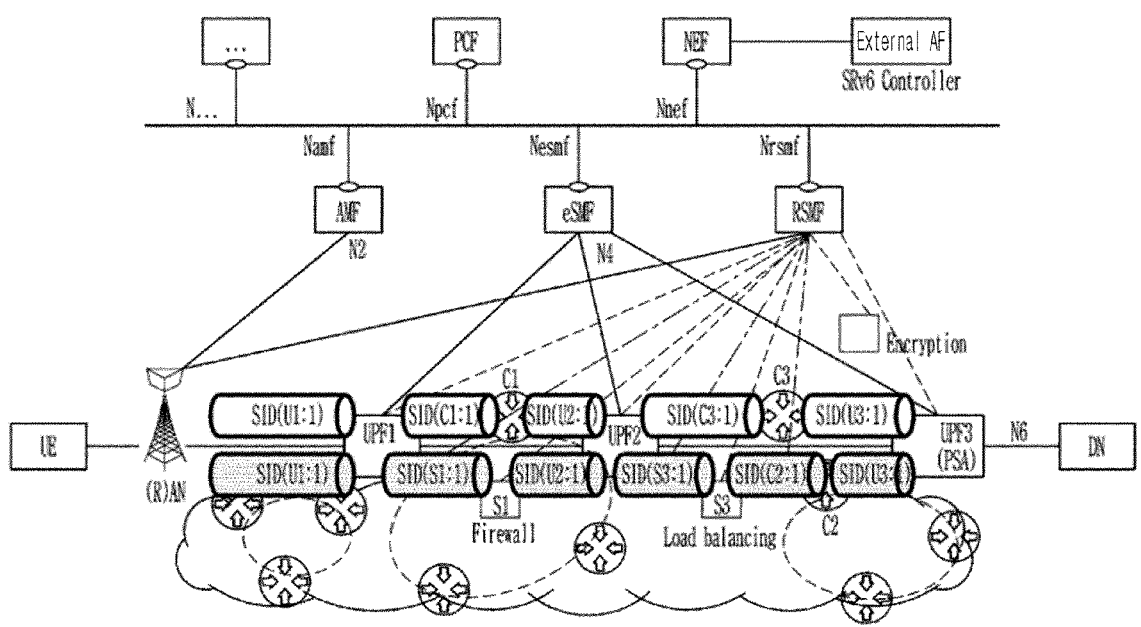
FIG. 9 is a diagram illustrating a transport network integrated mobile core network according to an embodiment.

FIG. 9 is a diagram illustrating a transport network integrated mobile core network according to an embodiment.

In an embodiment, each network resource within a transport network integrated mobile core network has SRv6 applied. FIG. 9 shows two network paths connecting the (R)AN with the UPF(PSA) when the states of the network resources of the mobile core network and the transport network are simultaneously considered. One segment in each path may make connection between the network resources, such as the NG-RAN and the UPF, of the mobile core network and the network resources of the transport network.

The path1 is expressed as <U1, C1, U2, C3, U3>. In the path1, the U1 segment is positioned between the (R)AN and the UPF1, the C1 segment is positioned between the UPF1 and the C1 router/switch, the U2 segment is positioned between the C1 router/switch and the UPF2, the C3 segment is positioned between the UPF2 and the C3 router/switch, and the U3 segment is positioned between the C3 router/switch and the UPF3.

The path2 is expressed as <U1, S1, U2, S3, C2, U3>. In the path2, two segments may be positioned between the UPF1 and the UPF2 for firewalls, and two segments may be positioned between the UPF2 and the C2 router/switch for load balancing. That is, the path2 is a network path that satisfies service chaining requirements, such as firewalls and load balancing.

In the meantime, an embodiment of the present disclosure is not implemented only through an apparatus and/or a method described so far, and may be implemented through a program that realizes a function corresponding to a configuration of the embodiment of the present disclosure, or through a recording medium on which the program is recorded. This implementation can be easily derived by those skill in the art to which the present disclosure pertains from the description of the embodiment above. Specifically, a method (for example, a network management method, a data transmission method, and a transmission schedule generation method) according to an embodiment of the present disclosure may be implemented in the form of program commands executable through various computer means, and may be recorded on a computer-readable medium. The computer-readable recording medium may include program commands, data files, data structures, and the like separately or in combinations. The program commands recorded on the computer-readable medium may be particularly designed and configured for an embodiment of the present disclosure, or may be known to those skilled in the art of computer software and available. The computer-readable recording medium may include hardware devices configured to store and execute program commands. Examples of the computer-readable recording medium include magnetic media such as hard disks, floppy disks, and magnetic tapes; optical recording media such as CD-ROMs, and DVD-ROMs; magneto-optical media such as floptical disks; ROMs, RAMs, and flash memory. The program commands may include not only machine language codes, which are created by a compiler, but also high-level language codes, which may be executed by a computer by using an interpreter.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A network function within a mobile core network, the network function comprising:

a processor and a memory, wherein the processor is configured to execute at least one program stored in the memory to perform:

receiving a state measurement value or a state prediction value corresponding to the state measurement value of a state of a plurality of network resources within the mobile core network and a transport network, and computing a path for forwarding user data, on the basis of either the state measurement value or the state prediction value, and topology of the mobile core network and topology of the transport network, wherein the processor is configured to execute the at least one program to further perform receiving a first performance evaluation result for the state measurement value and a second performance evaluation result for the state prediction value, and making a request to a resource state management function for either the state measurement value or the state prediction value on the basis of the first performance evaluation result and the second performance evaluation result.

2. The network function of claim 1, wherein the processor is configured to execute the at least one program to further perform receiving a second performance evaluation result for the state prediction value when the first performance evaluation result indicates bad.

3. The network function of claim 2, wherein when performing the making of the request to the resource state management function for either the state measurement value or the state prediction value on the basis of the first performance evaluation result and the second performance evaluation result, the processor is configured to perform making the request to the resource state management function for the state prediction value when both the first performance evaluation result and the second performance evaluation result indicate bad.

4. The network function of claim 2, wherein when performing the making of the request to the resource state management function for either the state measurement value or the state prediction value on the basis of the first performance evaluation result and the second performance evaluation result, the processor is configured to perform making the request to the resource state management function for the state measurement value when the first performance evaluation result indicates bad and the second performance evaluation result indicates good.

5. A method for determining a path for forwarding user data, the method comprising:

receiving a state measurement value or a state prediction value corresponding to the state measurement value of a state of a plurality of network resources within a mobile core network and a transport network; and computing the path for forwarding the user data, on the basis of either the state measurement value or the state prediction value, and topology of the mobile core network and topology of the transport network, wherein the method further comprising:

receiving a first performance evaluation result for the state measurement value and a second performance evaluation result for the state prediction value; and making a request to a resource state management function for either the state measurement value or the state prediction value on the basis of the first performance evaluation result and the second performance evaluation result.

6. The method of claim 5, further comprising:

receiving a second performance evaluation result for the state prediction value when the first performance evaluation result indicates bad.

7. The method of claim 6, wherein the making of the request to the resource state management function for either the state measurement value or the state prediction value on the basis of the first performance evaluation result and the second performance evaluation result comprises making the request to the resource state management function for the state prediction value when both the first performance evaluation result and the second performance evaluation result indicate bad.

8. The method of claim 6, wherein the making of the request to the resource state management function for either the state measurement value or the state prediction value on the basis of the first performance evaluation result and the second performance evaluation result comprises making the request to the resource state management function for the state measurement value when the first performance evaluation result indicates bad and the second performance evaluation result indicates good.

9. A network function within a mobile core network, the network function comprising:

a processor and a memory, wherein the processor is configured to execute at least one program stored in the memory to perform:

receiving state measurement values from a first network resource within the mobile core network and a second network resource within a transport network, generating state prediction values of the first network resource and the second network resource, wherein the state prediction values correspond to the state measurement values, evaluating, on the basis of the state measurement values and the state prediction values, performances of the first network resource and the second network resource, and forwarding, on the basis of results of the performance evaluation, the state measurement values or the state prediction values to a session management function to set a path, wherein the processor is configured to execute the at least one program to further perform transmitting a first performance evaluation result for the state measurement value and a second performance evaluation result for the state prediction value, and transmitting either the state measurement value or the state prediction value on the basis of the first performance evaluation result and the second performance evaluation result.

\*    \*    \*    \*    \*